Figure 1:
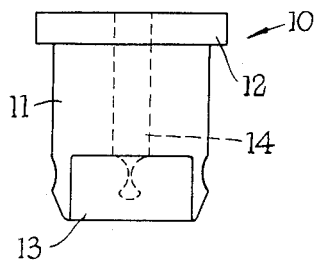

May 31, 1966     P. C. R. FERNBERG     3,253,480
PIVOT PINS

Filed Aug. 27, 1963                              4 Sheets-Sheet 1

INVENTOR:
PAUL CARL ROGER FERNBERG,
By Gordon Needleman
ATT'Y.

May 31, 1966     P. C. R. FERNBERG     3,253,480
PIVOT PINS

Filed Aug. 27, 1963     4 Sheets-Sheet 2

INVENTOR:
PAUL CARL ROGER FERNBERG,
BY *Gordon McClennan*
ATT'Y.

May 31, 1966 P. C. R. FERNBERG 3,253,480
PIVOT PINS

Filed Aug. 27, 1963 4 Sheets-Sheet 3

INVENTOR:
PAUL CARL ROGER FERNBERG,
BY Gordon Needleman
ATTY.

May 31, 1966 P. C. R. FERNBERG 3,253,480
PIVOT PINS
Filed Aug. 27, 1963 4 Sheets-Sheet 4
FIG.13
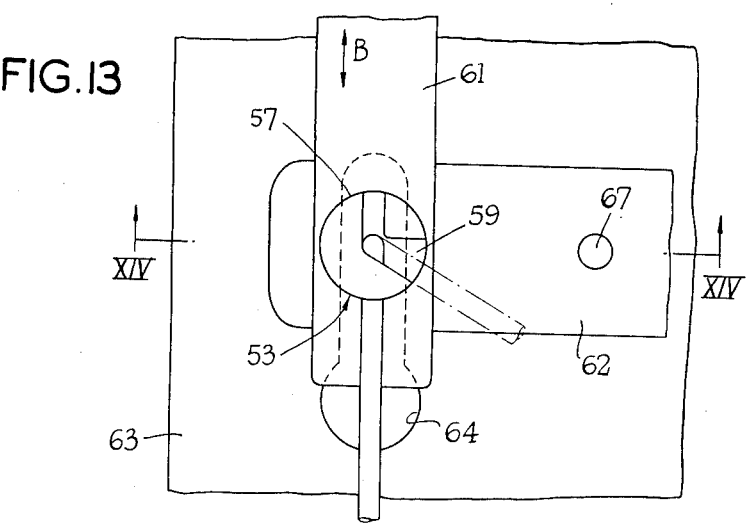
FIG.14
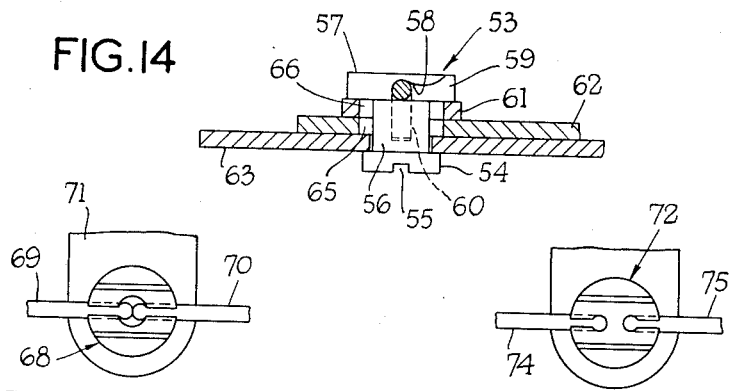
FIG.15 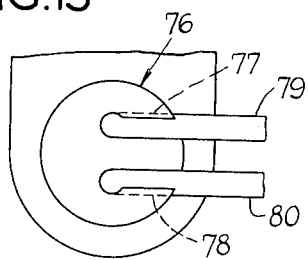 FIG.16 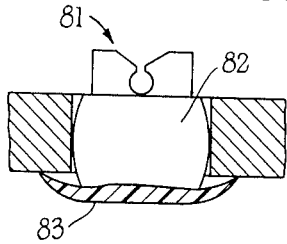
FIG.17
FIG.18
INVENTOR:
PAUL CARL ROGER FERNBERG,
By Gordon McClellan
ATTY.

United States Patent Office 3,253,480
Patented May 31, 1966

3,253,480
PIVOT PINS
Paul Carl Roger Fernberg, Farnham Common, England, assignor to United-Carr Incorporated, a corporation of Delaware
Filed Aug. 27, 1963, Ser. No. 304,752
Claims priority, application Great Britain, Sept. 4, 1962, 33,871/62; May 21, 1963, 20,222/63; June 26, 1963, 25,490/63
4 Claims. (Cl. 74—501)

The present invention relates to a pivot pin which is particularly but not exclusively suitable for attaching a cable to an actuating lever.

According to the invention there is provided a pivot pin having a cylindrical shank and an enlarged head, a longitudinal bore in the shank running out of the tail of the shank, that is the end opposite the head, and a groove in the tail end of the shank running from the bore to the circumference of the shank.

According to a further aspect of the invention there is provided an assembly of a cable pivotally secured to an apertured lever with the aid of a pivot pin as defined in the preceding paragraph, wherein the shank of the pin extends through the aperture in the lever and is rotatable therein, the heat butts against one side of the lever and the tail projects at least partially from the aperture on the other side of the lever, the end of the cable is bent approximately at right angles, the bent end of the cable lies in the bore in the shank and the portion of the cable adjacent the bent end is seated in the groove in the tail.

According to a yet further aspect of the invention there is provided an assembly of a cable secured to an apertured lever, which is slidably mounted on a support panel, with the aid of a pivot pin as defined in the preceding paragraph but one, wherein the tail end of the pin has a flange of greater cross-section than the shank, the support is formed with a keyhole slot, the link extends along the slot and a pivoted lever formed with an elongate aperture lies between the support and the link, the head of the pin is of greater diameter than the diameter of the aperture in the link and the transverse dimensions of the elongate aperture in the lever, the shank of the pivot pin extends through the narrower portion of the keyhole slot, the elongate aperture in the lever and the aperture in the link, the head of the pin overlies the edges of the keyhole slot, the flanged tail overlies the edge of the aperture in the link and the cable is bent at approximately 90° and engaged to the pin with the bent end secured in the bore in the shank and the adjacent portion seated in the groove, the arrangement being such that movement of the link is imparted to the cable through the pin and angular movement of the link is limited so as to prevent the pin entering the wider portion of the keyhole slot.

Figure 2:
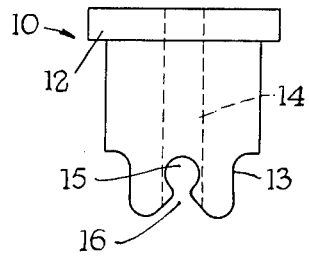
Figure 3:
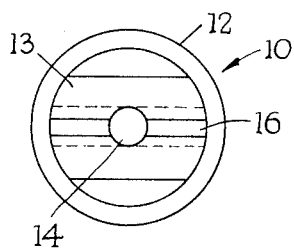
Figure 4:
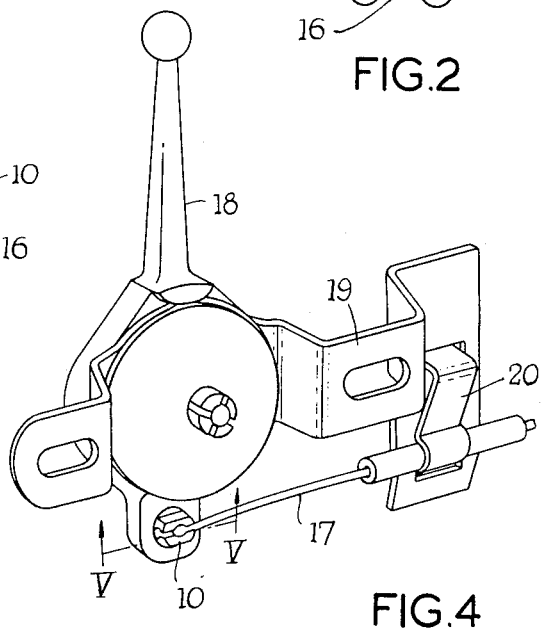
Figure 5:
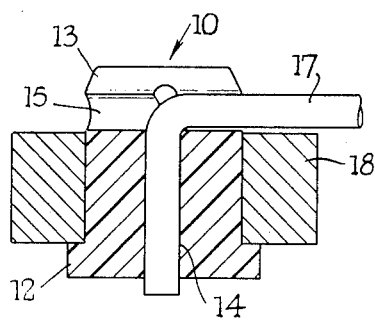
Figure 6:
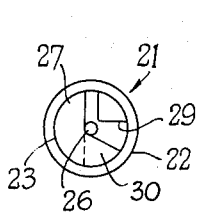
Figure 7:
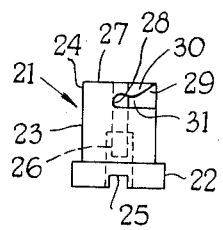
Figure 9:
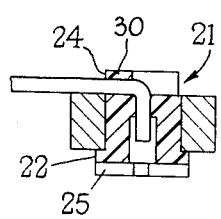
Figure 8:
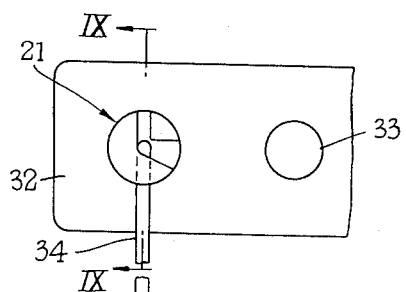
Figure 19:
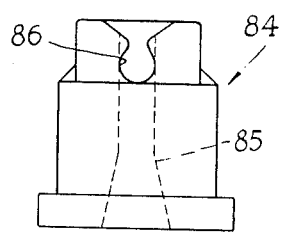
Figure 20:
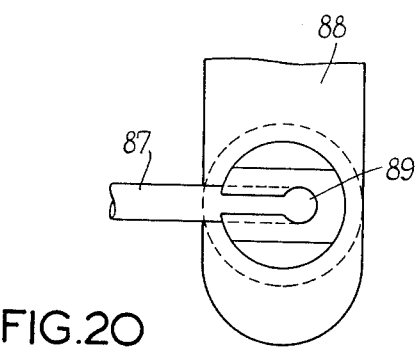
Figure 10:
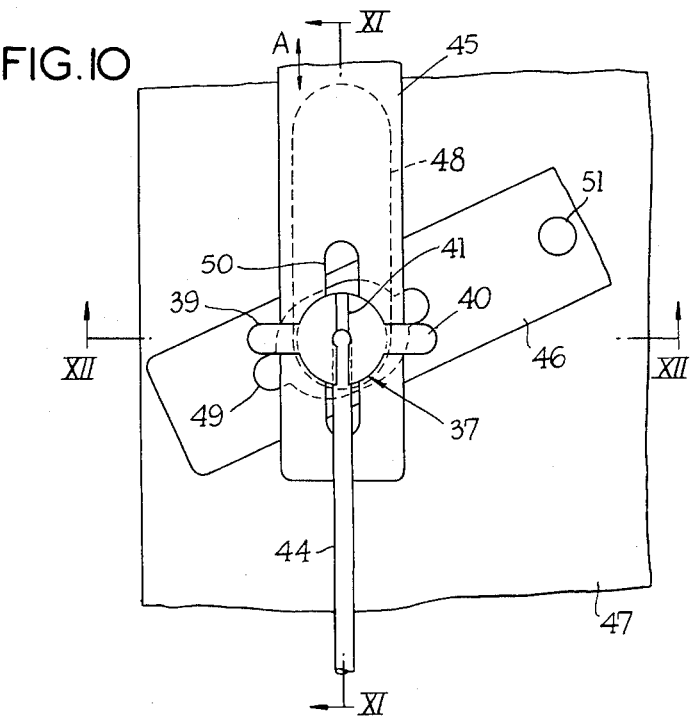
Figure 11:
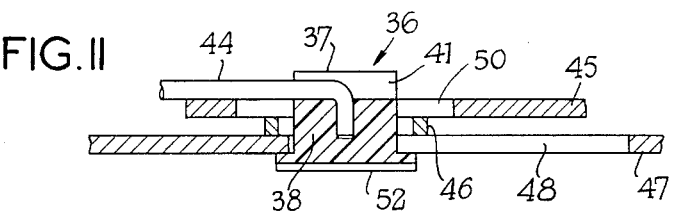
Figure 12:
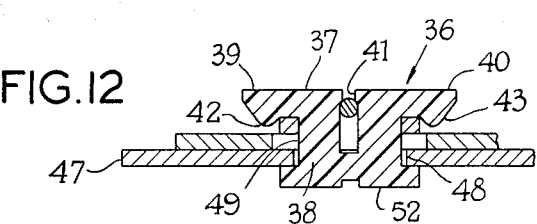

Preferred forms of the invention will now be described with reference to the accompanying diagrammatic drawings, in which:

FIG. 1 is a front elevation of a pivot pin;
FIG. 2 is a side elevation of a pivot pin;
FIG. 3 is a top plan view of a pivot pin;
FIG. 4 is a perspective view of a cable attached to a lever by the pivot pin shown in FIGS. 1 through 3;
FIG. 5 is a section taken on line V—V of FIG. 4;
FIG. 6 is a top plan view of a variation of the pivot pin shown in FIG. 1;
FIG. 7 is a side elevation of the pivot pin shown in FIG. 6;
FIG. 8 is a plan view of a cable attached to a lever using the pivot pin on FIGS. 6 and 7;
FIG. 9 is a section taken on line IX—IX of FIG. 8;
FIGURE 10 is a plan view showing a cable linked to a lever and held to a support panel by another modified pin;
FIG. 11 is a section taken on line XI—XI of FIG. 10;
FIG. 12 is a section taken on line XII—XII of FIG. 10;
FIGURE 13 is a plan view of yet a further modification of the invention;
FIGURE 14 is a section on the line XIV—XIV of FIGURE 13;
FIG. 15 is a top plan view of a variation of the pivot pin shown in FIG. 1;
FIG. 16 is another modification of the pivot pin shown in FIG. 1;
FIG. 17 is a plan view of still another modification of the pivot pin shown in FIG. 1;
FIG. 18 is a section partly in side elevation of another variation of the pivot pin shown in FIG. 1;
FIG. 19 is a side elevation of still another variation of the pivot pin shown in FIG. 1; and
FIG. 20 is a top plan view of the pivot pin shown in FIG. 19.

In FIGURES 1 to 3 there is indicated generally at 10 a pivot pin which is formed from a mouldable material such as a synthetic plastic.

The pin 10 comprises a cylindrical shank 11 having at one end a head 12, at the other end a tail portion 13 and a longitudinal through bore 14. The bore 14 lies on the axis of the shank and the end face of the tail 13 is formed with a diametrical groove 15 having an elongated open mouth 16.

The bore 14 runs into the groove 16 which is undercut, as shown in FIGURE 2.

The pivot pin 10 may be used, in the manner shown in FIGURE 4 to pivot a cable 17 to a lever 18.

The lever 18 is itself pivoted to a support panel 19 and the cable 17 forms the inner part of a sheathed cable which is attached to the support panel 19 with the aid of a clip 20.

The cable 17 which is free to move axially through its sheath is attached to the lever 18 in the following manner.

The shank 11 is inserted through an aperture, not referenced, in the lever 18 until the tail portion 13 projects from the aperture. In this position the head 12 butts against the underside of the lever and, if desired the aperture in the lever may be stepped to accommodate the head.

The end of the cable 17 is then bent at right angles and the bent end 21 is forced down into the bore 14 until the cable itself snap-engages into the undercut groove 15.

The overhang on the groove 15 is sufficiently resilient to allow the cable 17 to be pressed home and the shape of the open mouth 16 provides a lead-in for the cable which facilitates assembly.

When the cable 17 is assembled the head 12 prevents the pivot pin 10 from passing through the aperture in the lever 18 and the cable 17 prevents it from being withdrawn. The undercut groove 15 will hold the cable 17 under normal operating stresses and thus the cable is securely pivoted to the lever 18.

When the lever 18 is rotated on the support panel 19 it pivots around the pivot pin 10 and axial movement is imparted to the cable 17 which may be used to actuate any mechanism to which it is operatively connected.

A modification of the pivot pin 10 is indicated generally at 21 in FIGURES 6 to 9.

The pivot pin 21, which is similar to the pivot pin 10 comprises a head 22, which is substantially circular, a cylindrical shank 23 and a tail 24.

The outer face of the head 22 has a slot 25 for the reception of a screw-driver or similar tool and an axial bore 26 is provided in the shank 23.

The end face 27 of the shank 12 has an undercut groove 28 which opens into a wedge shaped, radially extending slot 29.

An overhang 30 has a lip 31 adjacent the groove 28 so that a cable may be snap-engaged from the slot 29 under the lip 31 and into the groove 28.

The pivot pin 21 is used in a similar manner to the pin 10 in the assembly shown in FIGURES 8 and 9.

A lever 32 is pivoted at 33 to a support (not shown) and a cable 34, which forms the inner part of a sheathed cable attached, at a distance from the lever to a support 35.

The cable 34, which is free to move axially through its sheath is attached to the lever 32 in the following manner.

The shank 23 of the fastener 21 is inserted through an aperture, not referenced, which is provided in the end of the lever 32, until the groove 28 and slot 29 are clear of the upper surface of the lever.

The pivot pin 21 is rotated until the slot 29 is aligned with the cable 34 and the free end of the cable is bent at right angles and pressed down into the bore 26 until the cable itself lies on the base of the slot 29.

The fastener is then rotated, with the aid of a screw-driver, until the cable 34 snap-engages past the lip 31 and into the groove 28.

As will be seen from FIGURE 9, the head 22 prevents the pivot pin from passing through the aperture in the lever 32 and the cable prevents it from being withdrawn. The lip 31 prevents the pivot pin from rotating relatively to the cable under normal operating stresses and thus the cable 34 is securely pivoted to the lever 32.

When the cable 34 is assembled in the manner shown in FIGURE 8, and the lever 32 is rotated, it pivots around the pin 21 and axial movement is imparted to the cable 34, which may be used to actuate any mechanism to which it is operatively connected.

A further embodiment of the invention is indicated generally at 36 in FIGURES 10 to 12.

The pivot pin 36 is similar in some respects to the pivot pin 10 and the similar features are not recited.

The pivot pin 36 differs from the pivot pin 10 in that the tail 37 of the shank 38 is flanged so as to have oppositely extending wings 39 and 40.

The undercut groove 41 in the tail 37 is perpendicular to the direction of the wings 39, 40 each of which has an overhang 42 and 43 respectively, as can be seen from FIGURE 12.

The pivot pin 36 is used to attach a cable 44 to a link 45 and to move the link 45, and a pivoted lever 46 in sliding engagement on a support 47.

The support 47 has an elongate slot 48 of smaller width than the diameter of the head 52 of the pin 36. The lever 46, which is located between the support 47 and the link 45, and the link 45 each have an aperture 49 and 50 respectively of such shape and dimensions that the tail end 37 of the pin 36 is a close clearance fit therethrough.

In order to secure the link 45 and lever 46 to the support 47 the shank 38 of the pin 36 is passed through the slot 48 in the support 47 and then rotated through 90° until the wings 39 and 40 extend across the slot 48. The lever 46 is pressed over the tail end of the pin and securely pivoted to the support at 51. Finally the pin is rotated through 90° until the wings 39 and 40 are in line with the slot 48 in the support 47 and the wings are passed through the aperture in the link 45 and again rotated through 90° until the overhangs 42 and 43 snap-engage over the sides of the link 45.

To complete the assembly the end of the cable 44 is bent at 90° and pressed home into the axial bore in the pin until the adjacent part of the cable snap-engages into the undercut groove 41.

When the assembly is complete the pivot pin 36 can move along the length of the slot 48 and thus axial movement can be imparted to the cable 44 by moving the link 45 in the direction of the arrow A or rotating the lever 46 about its pivot point 51.

In order to facilitate rotation of the pivot pin 36 the head 52 may be formed with a slot for a screw-driver.

Another modification of the invention is illustrated in FIGURES 13 and 14, which is similar to the modification of FIGURES 10 to 12.

In FIGURES 13 and 14 a pivot pin is indicated generally at 53 which has a circular head 54 having a screw-driver slot 55, a cylindrical shank 56 and a flanged tail end 57. The tail has a groove 58 and slot 59 similar to the pivot pin 21 of FIGURES 6 and 7 and the shank has an axial bore 60.

As shown in FIGURE 13 the pin 53 is used to attach a cable to a link 61 and pivot the link 61 and lever 62.

The support 63 is formed with a keyhole slot 64, the lever 62 has an elongate aperture 65 and the link 61 has a circular aperture 66.

In order to assemble the parts together the link 61 and lever 62 are positioned with their respective apertures 65 and 66 overlying the wider part of the keyhole slot 64. The pivot pin 53 is inserted head first through the apertures 65 and 66 and the wider part of the keyhole slot 64 and then slid into the narrower portion of the slot 64 so that the head 54 overlies the edges of the slot and secures the link and lever to the support.

The lever 62 is then pivotally secured to the support at 67 and means, which are not shown in the drawing, are provided to limit rotation of the lever 62 about the pivot point 67 to ensure that the pivot pin 53 cannot slide out of the narrower portion of the keyhole slot 64. Finally the cable is attached to the pivot pin in the manner described above with reference to the assembly of FIGURE 8.

If desired, the shank of the pivot pin 53 may be made square in section and a square aperture formed in the link 61. Thus, when assembled the pivot pin is keyed into the aperture in the link and cannot rotate.

When the pivot pin 53 is modified in this manner the cable is attached to the pivot pin by pressing the bent end down into the axial bore 60, into the position shown in broken line in FIGURE 13, and then rotated so as to pass under the overhang, not referenced, on the flanged tail end 57. In this modification the overhang need not be formed with a lip so that the cable is merely slid rather than snap-engaged into position.

Thus, the pivot pin 53 is free to move along the narrower portion of the keyhole slot 64 and axial movement can be imparted to the cable by moving the link 61 in the direction of the arrow B or by rotating the lever 62 around the pivot point 67 on the support.

Four further embodiments of the invention are illustrated in FIGURES 15 to 18 respectively.

In FIGURE 15 a pivot pin is indicated generally at 68 which is similar to the pivot pin 10 of FIGURES 1 to 3. The pin 68 is used to secure two cables 69 and 70 to an apertured lever 71.

The end of each cable is bent at 90° and the bent ends are both forced down into the axial aperture in the shank of the pin until the adjacent portions of each cable are gripped in the undercut groove in the tail of the pin.

Thus, movement of the lever 71 actuates both of the cables 69 and 70.

In FIGURE 16 a pivot pin is indicated generally at 72 which is similar to the pin 68 except that it has a shank 73 formed with two longitudinal bores and a cable 74 and 75 respectively is engaged in each bore.

In FIGURE 17 a pivot pin is indicated generally at 76 which is similar to the pin 72 except that undercut grooves 77 and 78 respectively extend in parallel from each bore to the circumference of the tail end of the shank so that cable 79 and 80 are held in parallel.

In FIGURE 18 a pivot pin is indicated generally at 81 which is similar to the pivot pin 10 of FIGURES 1 to 3 except that it has a shank 82 which is barrel-shaped and a head 83 in the form of a resilient circular skirt.

The pivot pin 81 is used in the same manner as the pivot pin 10 and has the advantage that it can move universally in the aperture in the lever to which it is attached thus allowing limited universal movement between the cable and lever.

It will be appreciated that any of the pivot pins described herein may be modified in the same manner as the pivot pin 81.

In FIGURES 19 and 20 yet a further modification of the invention is illustrated. A pivot pin 84 is similar to the pivot pin 10 of FIGURES 1 to 3 except that it has a bore 85 which is offset from the centre of the shank and an undercut groove 86 extending from the bore 85 to the circumference of the shank.

The pivot pin 84 is used to attach a cranked rod 87 to an apertured lever 88.

To make the assembly the pivot pin is inserted through the aperture in the lever 88 and the crank 89 is forced down into the bore 85 until the rod itself snap-engages into the undercut groove 86.

In the assembled position the rod is secured to the lever and the crank and pivot pin are free to rotate in the aperture in the lever.

What I claim is:

1. An assembly of a cable pivotably secured to an apertured lever with the aid of a pivot pin, said pivot pin having a cylindrical shank and an enlarged head, a longitudinal bore in the shank running out to the tail of said shank, that is the end opposite the head and a groove formed in said tail running from the bore to the circumference thereof, said shank extending through an aperture in said lever and rotatable therein, said head abutting one side of said lever and said tail projecting at least partially from said aperture on the other side of said lever, the end of said cable being bent approximately at right angles, the bent end of said cable lying in the bore in said shank and the portion of the cable adjacent said bent end being seated in the groove in said tail 2. An assembly of a cable pivotably secured to an apertured lever with the aid of a pivot pin as set forth in claim 1 wherein said groove is undercut and wherein said bore is disposed on the axis of said shank.

3. An assembly of a cable secured to an apertured lever with the aid of a pivot pin as set forth in claim 2 wherein said groove extends diagonally across the end of said shank and wherein said shank has a second longitudinal bore and has a second groove running from the second bore to the circumference of said shank.

4. An assembly of a cable secured to an apertured lever which is slidably mounted on a support with the aid of a pivot pin, said pivot pin comprising a cylindrical shank and an enlarged head, a first longitudinal bore in said shank extending through the tail of said shank, that is the end opposite the head, a second longitudinal bore, and an undercut groove in said tail extending diagonally across the end of said tail from the first longitudinal bore to the circumference thereof, a second groove running from the second bore to the circumference of said shank and said tail having a flange of greater cross section than said shank and wherein the support is formed with a keyhole slot, a link extending along the slot and said lever formed with an elongated aperture lying between the support and said link, the head of said pin being of greater diameter than the diameter of the aperture in said link and the transverse dimension of the elongated aperture in said lever, said shank of the pivot pin extending through the narrow portion of said keyhole slot, the elongated aperture in said lever and the aperture in said link, the head of said pin overlying the edge of said keyhole slot, the flange tail overlying the edge of the aperture in said link and the cable being bent at approximately 90° and engaged to said pin with the bent end secured in the bore in said shank and the adjacent portion seated in said undercut groove.

References Cited by the Examiner

UNITED STATES PATENTS

| | | | |
|---|---|---|---|
| 62,985 | 3/1867 | Welch | 287—93 |
| 1,260,465 | 3/1918 | Shakespeare et al. | 74—501 |
| 1,325,286 | 12/1919 | Garber | 74—501 X |
| 2,167,868 | 8/1939 | Best | 74—513 |
| 2,179,582 | 11/1939 | Wiley | 287—93 |
| 2,542,423 | 2/1951 | Metzger | 74—501 |
| 2,648,351 | 8/1953 | Curtis et al. | |
| 2,711,653 | 6/1955 | Zero | 74—501 X |
| 2,846,174 | 8/1958 | Sewell | 248—302 X |
| 2,915,269 | 12/1959 | Fleming | 248—117.7 |
| 3,042,461 | 7/1962 | Smith | 308—15 |
| 3,045,505 | 7/1962 | Boehlow | 74—469 |
| 3,053,592 | 9/1962 | Runton et al. | 308—238 |
| 3,066,665 | 12/1962 | Reilly | 248—230 X |
| 3,082,642 | 3/1963 | Hammerand | 74—543 |
| 3,088,330 | 5/1963 | Thompson | 74—501 |
| 3,110,530 | 11/1963 | Herman | 308—238 |
| 3,122,386 | 2/1964 | Pearson | 287—93 |
| 3,127,141 | 3/1964 | Elliston | 248—117.6 |
| 3,138,419 | 6/1964 | Hammell et al. | 339—217 |
| 3,164,054 | 1/1965 | Biesecker | 287—93 X |

FOREIGN PATENTS

| | | |
|---|---|---|
| 19,307 | 1905 | Great Britain. |
| 294,447 | 7/1928 | Great Britain. |
| 879,110 | 10/1961 | Great Britain. |
| 977,862 | 12/1964 | Great Britain. |

BROUGHTON G. DURHAM, *Primary Examiner.*

CAROYLN F. GREEN, *Assistant Examiner.*